United States Patent [19]

Greenleaf et al.

[11] Patent Number: 5,217,758
[45] Date of Patent: Jun. 8, 1993

[54] SILICONE CONTAINING AUTOMOTIVE VINYL PROTECTANT

[75] Inventors: Suzanne M. Greenleaf; Martin E. Cifuentes, both of Midland, Mich.

[73] Assignee: Dow Corning Corporation, Midland, Mich.

[21] Appl. No.: 883,976

[22] Filed: May 15, 1992

[51] Int. Cl.$^5$ .............................................. B05D 5/02
[52] U.S. Cl. ................................. 427/387; 427/393.5
[58] Field of Search ............................ 427/387, 393.5

[56] References Cited

U.S. PATENT DOCUMENTS

| | | | |
|---|---|---|---|
| 4,261,758 | 4/1981 | Wright et al. | 427/387 |
| 4,304,897 | 12/1981 | Bluestein | 528/20 |
| 4,404,035 | 9/1983 | Ona et al. | 252/8.6 |
| 4,454,288 | 6/1984 | Lee et al. | 427/387 |
| 4,477,517 | 10/1984 | Rummel | 427/387 |
| 4,548,854 | 10/1985 | Wach | 427/387 |
| 4,642,265 | 2/1987 | Suzuki | 428/375 |
| 4,732,694 | 3/1988 | Gowland et al. | 252/174.21 |
| 4,828,885 | 5/1989 | Rosenberg | 427/393 |
| 4,846,887 | 7/1989 | Kuehnle | 106/31 |
| 5,036,131 | 7/1991 | Himstedt | 524/786 |
| 5,104,735 | 4/1992 | Cioffi et al. | 428/383 |

Primary Examiner—Shrive Beck
Assistant Examiner—Erma Cameron
Attorney, Agent, or Firm—Jim L. DeCesare

[57] ABSTRACT

A method is described for providing a protective finish to a vinyl substrate by applying to the vinyl substrate a vinyl protectant composition. In one embodiment the composition is an abrasive free mixture of a film forming polysiloxane; a diluent; and a wax in the form of micronized particles having an average diameter of 3-12 microns. In another embodiment, the composition is a hydrocarbon solvent free mixture of a film forming polysiloxane; water; and an amorphous silica in the form of fumed silica particles having an average diameter of 7-30 nanometers.

5 Claims, No Drawings

SILICONE CONTAINING AUTOMOTIVE VINYL PROTECTANT

BACKGROUND OF THE INVENTION

The invention relates to a vinyl protectant formulation containing micronized wax particles which have been found to reduce the glare of applied films. The invention also relates to vinyl protectant formulations containing fumed silica particles which not only reduce the glare of applied films but decrease the oily appearance and feel of such consumer applied products.

While leather is the material of choice, leatherlike materials are finding widespread use as substitutes for leather in applications where leather has been used traditionally. Synthetic leatherlike materials are less expensive substitutes for leather, and therefore in seating, upholstery and interior trim, leatherlike materials in the form of coated fabrics are prevalent in the automotive market where lower prices provide a competitive advantage. The most important polymer used in coated fabrics is polyvinyl chloride. This relatively inexpensive polymer resists aging processes readily, resists burning, and is very durable, rendering it ideal for vehicle upholstery and interior trim.

Many vinyl protectant products for cleaning, preserving and conditioning vinyl surfaces are formulated with the express purpose of providing a high level of gloss to the surface to which they are applied. However, automobile designs have changed and some models feature steeply sloping windshields. Because of the steepness of slope of the windshield, it has been found that glossy dashboards produce a glare on the windshield glass which creates a potential safety hazard for the driver of the vehicle. In an effort to solve the problem, some manufacturers have designed dashboard materials with a lower gloss level, and vehicle owners' manuals contain warnings against the use of consumer applied products which would tend to increase the level of gloss of the dashboard.

This trend toward softer-looking interiors has created the need for new vinyl protectant formulations which provide a reduced level of glare on surfaces to which they are applied. In accordance with the present invention, certain particulate materials when added to vinyl protectant formulations have been found to function as flattening agents and cause a significant decrease in glare, and in an alternate embodiment certain particulate materials provide an added benefit of simultaneously causing a reduction in the oily appearance and feel often characteristic of such products.

SUMMARY OF THE INVENTION

This invention is directed to a method for providing a protective finish to a vinyl substrate by the application to the vinyl substrate of a certain vinyl protectant formulation. In one embodiment of the invention, the formulation is an abrasive free mixture of a film forming polysiloxane; a diluent; and a wax in the form of micronized particles having an average diameter of 3-12 microns. Unexpectedly, it has been discovered that the micronized wax particles perform a beneficial function in reducing the gloss of the vinyl protectant as applied. This is a significant advantage in meeting the need of consumer applied automotive products which demand low glare capability especially as it relates to vehicle dashboard surfaces and interior trim.

In another and alternate embodiment of the present invention, the formulation constitutes a hydrocarbon solvent free mixture of a film forming polysiloxane; water; and an amorphous silica in the form of fumed silica particles having an average diameter of 7-30 nanometers. Like the first embodiment, unexpectedly it has been discovered that the silica particles reduce the gloss of the vinyl protectant as applied. In addition, the typical oily appearance and feel of consumer applied automotive vinyl protectant products is reduced with formulations in accordance with this alternate embodiment.

These and other features, objects and advantages of the present invention will become more apparent from a consideration of the following detailed description thereof.

DETAILED DESCRIPTION OF THE INVENTION

The silicone component of the vinyl protectant formulations of the present invention is an organic polysiloxane which is a film former having a viscosity in the range of about 5 to as high as several million centistokes, preferably about 100 to about 10,000 centistokes. More preferably, a mixture of polysiloxanes having relatively higher and relatively lower viscosities can be employed. Such polysiloxanes have the repeating unit

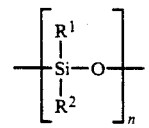

wherein n is an integer having a value greater than 1, $R^1$ is an alkyl radical containing 1 to 7 carbon atoms, inclusive, or a phenyl group, $R^2$ is hydrogen, an alkyl radical containing 1 to 7 carbon atoms, inclusive, or a phenyl group. Illustrative polysiloxanes encompassed by the above formula are polydimethylsiloxane, polydiethylsiloxane, polymethylethylsiloxane, polymethylphenylsiloxane, polydiphenylsiloxanes, diphenylsilanediol, and copolymers of two or more of the foregoing siloxanes. Polysiloxaneoxyalkylene block copolymers and silicone resins may also be utilized. Where the polysiloxane film former selected is a silicone resin, it is preferred in accordance with the present invention to employ a silanol functional phenyl based silicone resin having present in the resin $CH_3SiO_{1.5}$, $(CH_3)_2SiO$, $(CH_3)(C_6H_5)SiO$, and $(C_6H_5)_2SiO$ siloxane units. Such resins are typically commercially available in the form of a hydrocarbon solvent containing about fifty percent by weight solids.

In addition to the aforementioned organic polysiloxanes, the present compositions may include an aminofunctional polysiloxane. The amino-functional polysiloxane is a silicone fluid with highly polar pendant aminoalkyl modifying groups that enhance the durability of the film formed by the polysiloxanes present and promotes adhesion of the formed film to the vinyl substrate. Particularly preferred aminofunctional polysiloxanes include reactive and non-reactive hydrolyzable and non-hydrolyzable derivatives which are wholly, or in part, terminally substituted with aminopropyl, aminobutyl, or diamino pendant chains. Amine functional siloxane polymers can be represented by the formula

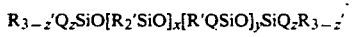

wherein R′ denotes an alkyl group of 1 to 4 carbons, OH, an alkoxy group, or a phenyl group, with the proviso that at least 50 percent of the total R′ groups are methyl; Q denotes an amine functional substituent of the formula —R″Z in which R″ is a divalent alkylene radical of 3 to 6 carbon atoms or a radical of the formula —CH$_2$CH$_2$CH$_2$OCH$_2$CHOHCH$_2$— and Z is a monovalent radical selected from the group consisting of —NR$_2$‴, —NR‴(CH$_2$)$_n$NR$_2$‴; and

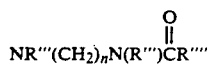

wherein R‴ denotes hydrogen or an alkyl group of 1 to 4 carbons, R″″ denotes an alkyl group of 1 to 4 carbons and n is a positive integer from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of x.

The vinyl protectants may include volatile low viscosity silicone fluids such as polydimethylcyclosiloxane and hexamethyldisiloxane. Such fluids have viscosities measured at twenty-five degrees Centigrade of from about 0.65 to about 5.0 centistokes. These volatile silicone fluids have the formula (CH$_3$)$_2$SiO$_x$ in which x is an integer from three to eight, and are often in the form of mixtures of tetramers and pentamers.

The silicone component of the vinyl protectant formulations of the present invention as enumerated above are commercially available materials known in the art.

The wax component of the vinyl protectant formulation of one embodiment of the present invention is a micronized particle form of one or more otherwise conventional waxes such as Fisher-Tropsch wax, polyethylene wax, polyethylene-polytetrafluoroethylene wax, polytetrafluoroethylene wax, polypropylene wax, natural wax, mineral wax, montan wax derivatives, fatty acid wax derivatives, amide wax, and mixtures thereof. While the particle size of these micronized wax particles typically varies from an average diameter of 2-45 microns, particle sizes in the range of 3-12 microns are preferred in the formulations in accordance with the present invention. Micronized wax particles are known in the art as evidenced by U.S. Pat. No. 4,846,887 issued Jul. 11, 1989. Micronized wax particles most suitable for use in the present invention are available from Micro Powders, Incorporated, Tarrytown, N.Y., and are sold under the trademark AQUABEAD®. AQUABEAD® products 270E, 418E and 519 are particularly preferred. These products are available in the form of aqueous wax emulsions having a viscosity of 35-500 centistokes and containing various combinations of paraffin and polyolefin waxes.

Diluents suitable for use in formulating products in accordance with the present invention are water, toluene, mineral spirits, ethanol and isopropanol.

The silica component of the vinyl protectant formulation of an alternate embodiment of the present invention is an amorphous silica particle. Preferably, the amorphous silica is in the form of fumed silica sometimes referred to as pyrogenic silica, although other forms of amorphous silica including naturally occurring amorphous silica could be employed. The critical feature however is that the particle size of the amorphous silica used be in the range of 7-30 nanometers, in order to achieve the benifits and advantages of the present invention. The amorphous silica found to be most suitable for purposes of the present invention is a colloidal form of silica particle having a surface area of 175-225 square meters per gram, and which is available commercially from Cabot Corporation, Tuscola, Ill. under the trademark Cab-O-Sil® M-5.

The concept of the invention is present in the form of two alternate embodiments. In the first embodiment, there is provided a method of providing a protective finish to a vinyl substrate in which there is applied to the vinyl substrate a vinyl protectant formulation which is an abrasive free mixture of 5-60 percent by weight of a film forming polysiloxane; 20-50 percent by weight of a diluent; and 1-20 percent by weight of a wax in the form of micronized particles having an average diameter of 3-12 microns. While various polysiloxanes may be used as the film former as enumerated above, preferably the film forming polysiloxane is a polydimethylsiloxane fluid having a viscosity of 100 to 1,000 centistokes, most preferably about 350 centistokes, or a silicone resin such as a silanol functional phenyl based silicone resin having present in the resin CH$_3$SiO$_{1.5}$, (CH$_3$)$_2$SiO, (CH$_3$)(C$_6$H$_5$)SiO, and (C$_6$H$_5$)$_2$SiO siloxane units. The diluent for the first embodiment may be one of water, toluene, mineral spirits, ethanol or isopropanol.

According to a second or alternate embodiment of the present invention, there is set forth a method of providing a protective finish to a vinyl substrate by applying to the vinyl substrate a vinyl protectant formulation which is a hydrocarbon solvent free mixture of 5-60 percent by weight of a film forming polysiloxane; 20-50 percent by weight of water; and 0.25-5 percent by weight of an amorphous silica in the form of fumed silica particles having an average diameter of 7-30 nanometers. The film forming polysiloxane used in the second embodiment can be the same as the polysiloxane used in the first embodiment noted above. Most preferably, the film forming polysiloxane is present in the mixture in an amount of 10-35 percent by weight, and the amorphous silica is present in the mixture in an amount of 0.25-2.5 percent by weight.

The following examples are set forth for the purpose of illustrating both the first and second embodiments of the present invention.

EXAMPLE I

In order to show the use and function of micronized wax particles as a matting agent in silicone containing vinyl protectant formulations, several abrasive free vinyl treating formulations were prepared and the constituents of each formulation are shown in Table I. The film forming polysiloxane employed in this example was a silicone resin in toluene diluted to a solids content of twenty percent by weight. The silicone resin was a silanol functional phenyl based silicone resin having CH$_3$SiO$_{1.5}$, (CH$_3$)$_2$SiO, (CH$_3$)(C$_6$H$_5$)SiO, and (C$_6$H$_5$)$_2$SiO siloxane units. The wax component of the abrasive free vinyl treating formulation was in the form of a micronized wax particle having an average diameter in the range of 3-12 microns. The micronized wax particle is commercially available from Micro Powders, Incorporated, Tarrytown, N.Y., under the trademark AQUABEAD® 519. The micronized wax particle was employed in the various formulations at a content which varied from a zero percent control formulation, to a formulation containing six weight percent of the micronized wax particle based on the weight of the active ingredients.

TABLE I

| Formulation | Silicone Film Former (grams) | Toluene Diluent (grams) | Micronized Wax (grams) |
|---|---|---|---|
| A | 18.0 | 27.22 | — |
| B | 18.0 | 26.10 | 0.90 |
| C | 18.02 | 25.21 | 1.80 |
| D | 18.02 | 24.32 | 2.71 |

Formulations A–D were each hand applied to a separate section of a gray automotive vinyl material. Following the elapse of thirty minutes, each gray vinyl test piece was visually examined under standard laboratory lighting. Each of the formulations was observed to have provided a noticeable enrichment in the color of the gray vinyl test piece. In particular, formulations B, C and D which contained the micronized wax particles were observed to have provided the added and unexpected benefit of a satiny lower gloss overall appearance. The lower gloss appearance of formulations B–D indicated that the micronized wax particles were capable of functioning as a matting agent in an abrasive free silicone containing vinyl protectant formulation. This function of the micronized wax particles is an advantage and benefit in formulating reduced glare products for meeting current demands of "softer looking" interiors for the automotive cleaner and coating market.

EXAMPLE II

Example I was repeated except that the film forming polysiloxane employed was a polydimethylsiloxane fluid having a viscosity of 350 centistokes measured at twenty-five degrees Centigrade which was diluted in mineral spirits to a content of twenty percent by weight. The formulations are shown below in Table II and the evaluations of these formulations was the same as the evaluations of Example I.

TABLE II

| Formulation | Silicone Film Former (grams) | Toluene Diluent (grams) | Micronized Wax (grams) |
|---|---|---|---|
| A | 4.00 | 16.00 | — |
| B | 4.00 | 15.71 | 0.50 |
| C | 4.00 | 15.31 | 0.80 |
| D | 4.01 | 14.80 | 1.20 |

EXAMPLE III

Example I was repeated except that the film forming polysiloxane employed was a sixty percent solids aqueous emulsion of polydimethylsiloxane fluid having a viscosity of 350 centistokes which had been emulsified using a nonionic surfactant. The wax component was a micronized wax particle available from Micro Powders, Incorporated, Tarrytown, N.Y., under the trademark AQUABEAD® 418E which is similar to AQUABEAD® 519 of Example I except that AQUABEAD® 418E is in the form of a specific thirty-five percent wax solids aqueous emulsion. The formulations were produced by shaking together the two emulsions. No other diluent was used to prepare these formulations. The formulations are shown below in Table III and the evaluations of these formulations was the same as the evaluations of Examples I and II, except that in Example III the formulations D and E exhibited significantly less gloss than the control formulation A while producing a satiny finish which enriched the color of the vinyl test piece.

TABLE III

| Formulation | Silicone Film Former (grams) | Wax Weight Percent | Micronized Wax (grams) |
|---|---|---|---|
| A | 16.00 | — | — |
| B | 16.53 | 2 | 1.00 |
| C | 15.54 | 4 | 2.00 |
| D | 14.53 | 6 | 3.03 |
| E | 11.50 | 12 | 6.00 |

EXAMPLE IV

Example III was repeated except that the film forming polysiloxane employed was a twenty-five percent solids aqueous emulsion of polydimethylsiloxane fluid in the form of a leading commercially available vinyl protectant. Two wax components were used each of which was a micronized wax particle available from Micro Powders, Incorporated, Tarrytown, N.Y., under the trademark AQUABEAD® 418E as noted in Example III and a second micronized wax particle AQUABEAD® 270E. AQUABEAD® 270E is the same as AQUABEAD® 418E with the exception of the particular paraffin and polyolefin waxes used to make the product. The formulations were produced by shaking together the three emulsions. No other diluent was used to prepare these formulations. The formulations containing ten and twenty weight percent of the micronized wax particles are shown below in Table IV. The formulations were applied to gray automotive vinyl and the following day gloss measurements were taken.

TABLE IV

| Formulation | Silicone Film Former (grams) | AQUABEAD® 418E Wax (grams) | AQUABEAD® 270E Micronized Wax (grams) |
|---|---|---|---|
| A | 20.07 | 2.07 | — |
| B | 20.02 | — | 2.00 |
| C | 20.07 | 4.02 | — |
| D | 20.24 | — | 4.14 |
| E | 20.00 | — | — |

Gloss was measured at an angle of sixty degrees with a Gardner Glossmeter. The instrument was calibrated with standards and three readings were taken for each of the samples tested. An average and a standard deviation were calculated for each sample. Comparisons were made with control samples. The results are set forth below in Table V and indicate that the formulations containing the micronized wax particles provided a reduction in gloss.

TABLE V

| Formulation | Gloss | +/− Deviation | Percent Reduction |
|---|---|---|---|
| A | 6.7 | .31 | 15.2 |
| B | 7.0 | .26 | 11.4 |
| C | 5.9 | .16 | 25.3 |
| D | 6.1 | .16 | 22.8 |
| E | 7.9 | .42 | — |
| Blank Gray Vinyl Test Surface | 3.3 | .05 | — |

EXAMPLE V

To illustrate the second and alternate embodiment of the present invention, amorphous silica with a particle size in the range of 7-30 nanometers was used to prepare an organic solvent free vinyl protectant formulation. The amorphous silica was a colloidal form of silica particle having a surface area of 175-225 square meters per gram available from Cabot Corporation, Tuscola, Ill. under the trademark Cab-O-Sil® M-5. The fumed silica was added to a twenty-five percent solids aqueous emulsion of polydimethylsiloxane fluid in the form of a leading commercially available vinyl protectant. The fumed silica component was present in the test formulations at a level of from 0.25-2.5 weight percent. The test formulations are shown below in Table VI.

TABLE VI

| Formulation | Silicone Film Former (grams) | Fumed Silica (grams) |
| --- | --- | --- |
| A | 20.04 | 0.50 |
| B | 20.23 | 0.21 |
| C | 20.38 | 0.10 |
| D | 20.17 | 0.05 |
| Control | 20.00 | — |

Each of the formulations was applied to blue automotive vinyl. Visual examinations were conducted under both laboratory lighting and outdoors in the sunlight. It was observed that an increase of the level of silica in the formulation caused a decrease in both the gloss of the formulation as well as a decrease in the oiliness of the formulation. In particular, formulation A which contained 2.5 percent silica produced a non-oily matte finish on the vinyl test piece. Sample B produced a finish on the vinyl test piece which retained the gloss level in comparison to the control formulation but which reduced the oily appearance and feel of the control formulation, which in this example was a leading commercially available vinyl protectant. This gloss reduction and the combined reduction of oiliness is an unexpected benefit and advantage of the formulations in accordance with this embodiment of the present invention.

It will be apparent from the foregoing that many other variations and modifications may be made in the compounds, compositions and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A method of providing a protective finish to a vinyl substrate comprising applying to the vinyl substrate a vinyl protectant composition which is an abrasive free mixture of 5-60 percent by weight of a film forming polysiloxane which is selected from the group consisting of a polydimethylsiloxane having a viscosity of 100 to 1000 centistokes and having a silanol functional phenyl based silicone resin having present in the resin $CH_3SiO_{1.5}$, $(CH_3)_2SiO$, $(CH_3)(C_6H_5)SiO$, and $(C_6H_5)_2SiO$ siloxane units; 20-50 percent by weight of a diluent; and 1-20 percent by weight of a wax in the form of micronized particles having an average particle size of 3-12 microns.

2. A method according to claim 1 in which the diluent is selected from the group consisting of water, toluene, mineral spirits, ethanol and isopropanol.

3. A method of providing a protective finish to a vinyl substrate comprising applying to the vinyl substrate a vinyl protectant composition which is a hydrocarbon solvent free mixture of 5-60 percent by weight of a film forming polysiloxane which is selected from the group consisting of a polydimethylsiloxane fluid having a viscosity of 100 to 1000 centistokes and having a silanol functional phenyl based silicone resin having present in the resin $CH_3SiO_{1.5}$, $(CH_3)_2SiO$, $(CH_3)(C_6H_5)SiO$, and $(C_6H_5)_2SiO$ siloxane units; 20-50 percent by weight of water; and 0.25-5 percent by weight of an amorphous silica in the form of fumed silica particles having an average particle size of 7-30 nanometers.

4. A method according to claim 3 in which the film forming polysiloxane is present in the mixture in an amount of 10-35 percent by weight.

5. A method of providing a protective finish to a vinyl substrate comprising applying to the vinyl substrate a vinyl protectant composition which is a hydrocarbon solvent free mixture of 5-60 percent by weight of a film forming polysiloxane; 20-50 percent by weight of water; and 0.25-2.5 percent by weight of an amorphous silica in the form of fumed silica particles having an average particle size of 7-30 nanometers.

* * * * *